(12) United States Patent
Ahlberg et al.

(10) Patent No.: US 8,813,975 B2
(45) Date of Patent: Aug. 26, 2014

(54) SCREEN MEDIA ELEMENT HAVING CERAMIC SECTIONS WITH APERTURES

(75) Inventors: Peter Ahlberg, Trelleborg (SE); Mike Bygrave, Perth (AU); Jens Lagerskiold, Malmo (SE); Claes Larsson, Bjarred (SE); Gerald van Niekerk, Queensland (AU)

(73) Assignee: Metso Minerals (Sweden) AB, Trelleborg (SE)

( * ) Notice: Subject to any disclaimer, the term of this patent is extended or adjusted under 35 U.S.C. 154(b) by 236 days.

(21) Appl. No.: 13/349,734

(22) Filed: Jan. 13, 2012

(65) Prior Publication Data

US 2013/0180911 A1 Jul. 18, 2013

(51) Int. Cl.
| | | |
|---|---|---|
| *B01D 33/03* | (2006.01) | |
| *B01D 33/37* | (2006.01) | |
| *B01D 35/20* | (2006.01) | |
| *B01D 29/31* | (2006.01) | |
| *B01D 39/14* | (2006.01) | |
| *B01D 29/05* | (2006.01) | |

(52) U.S. Cl.
CPC ............... *B01D 29/05* (2013.01); *B01D 33/03* (2013.01)
USPC ........... 210/483; 210/163; 210/232; 210/384; 210/388; 210/495; 210/498; 210/499

(58) Field of Classification Search
None
See application file for complete search history.

(56) References Cited

U.S. PATENT DOCUMENTS

| | | | | | |
|---|---|---|---|---|---|
| 4,960,510 | A | * | 10/1990 | Wolff | 209/405 |
| 5,755,334 | A | * | 5/1998 | Wojcik et al. | 209/399 |
| 2009/0050539 | A1 | * | 2/2009 | Gronvall et al. | 209/391 |

FOREIGN PATENT DOCUMENTS

AU 73165/87 A 11/1987

OTHER PUBLICATIONS

Australian Patent Examination Report dated Jun. 17, 2013.

* cited by examiner

*Primary Examiner* — Benjamin Kurtz
(74) *Attorney, Agent, or Firm* — Andrus Intellectual Property Law, LLP

(57) ABSTRACT

A screen media element having at least one apertured section. The apertured section has a first surface intended to receive and carry material to be screened, a second surface opposite the first surface, apertures extending from the first surface to the second surface and a circumferential surface connecting the first and second surfaces. The apertured section is surrounded by an outer frame along the circumferential surface, characterized in that the apertured section is made from ceramic material and that the outer frame is made of elastomeric material. The invention further relates to a method for manufacturing such a screen media element, and a screen comprising such screen media elements.

8 Claims, 3 Drawing Sheets

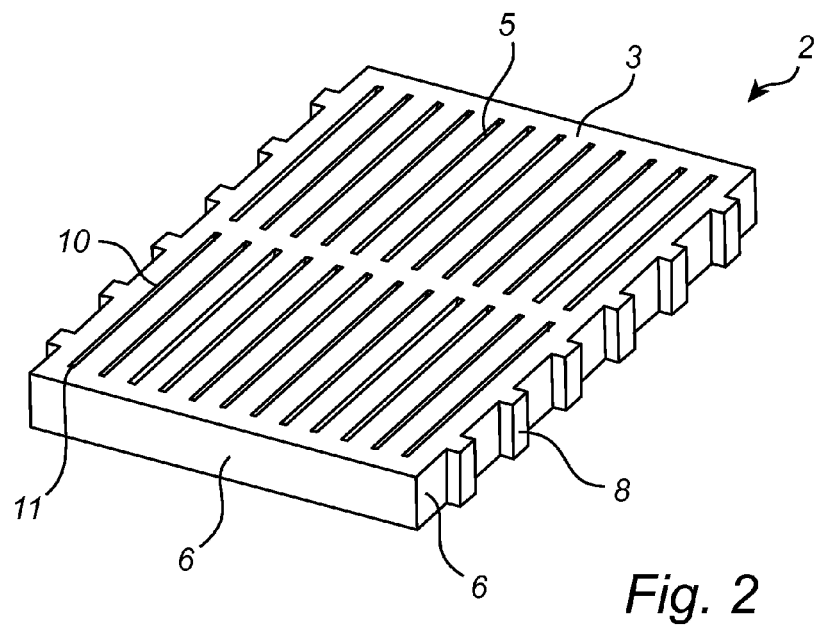
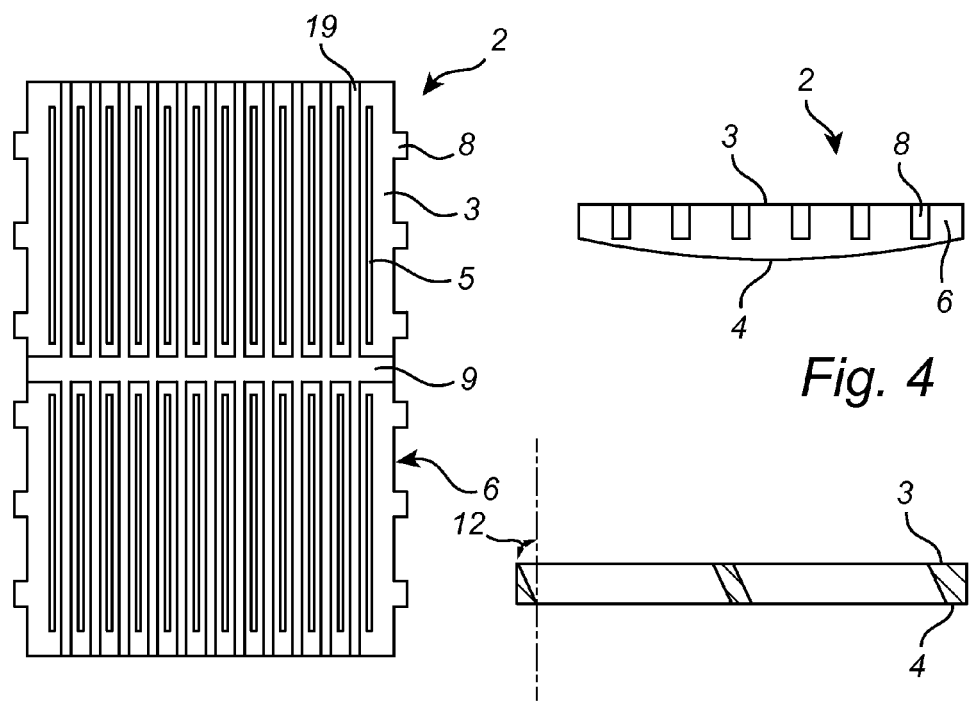

SCREEN MEDIA ELEMENT HAVING CERAMIC SECTIONS WITH APERTURES

FIELD OF THE INVENTION

The present disclosure relates to a screen media element having at least one apertured section, the apertured section having a first surface intended to receive and carry material to be screened, a second surface opposite the first surface, apertures extending from the first surface to the second surface, and a circumferential surface connecting the first and second surfaces, the apertured section being surrounded by an outer frame along the circumferential surface.

BACKGROUND

When mining coal, it is common to use wet screening for screening the coal. The screening is usually executed using a screening device such as a banana screen, comprising one or more screen media elements. The screen media element can be made from rubber and/or thermoplastic polyurethane or comprise of a number of stainless steel wedge wires. However, neither of these materials are sufficiently wear resistant in order to withstand the abrasive wear caused by the passing coal.

SUMMARY

It is an object of the present disclosure to mitigate the above problems, and to provide a screening device which is wear resistant enough to withstand the wear from the flows of coal which are used in current coal screening processes.

According to a first aspect of the present disclosure, these objects are achieved by a screen media element having at least one apertured section, the apertured section having a first surface intended to receive and carry material to be screened, a second surface opposite the first surface, apertures extending from the first surface to the second surface, and a circumferential surface connecting the first and second surfaces, the apertured section being surrounded by an outer frame along the circumferential surface, characterised in that said apertured section is made from ceramic material and that the outer frame is made of elastomeric material.

Such a screen media element provides a component for a screening device, such as a banana screen, which is sufficiently durable due to the ceramic material, but which still is flexible and has shock absorbing properties due to the surrounding elastomeric material. Further, ceramics is a relatively cheap material and is easily cast into a desired, apertured shape.

In one embodiment, the elastomeric material is polyurethane. This is a material which, depending on its composition, can be given many different properties and which is commonly used in screening devices.

At least one projection may be formed on the circumferential surface of the apertured section for engagement with the outer frame, which is a simple and effective way of fixing the apertured section to the outer frame.

In another embodiment, at least one channel is formed in the first surface of the apertured section, the channel containing elastomeric material. The use of such a channel not only provides a shock absorbing section to the ceramic, but also acts as a barrier which prevents any cracks in the ceramic from spreading across the apertured section.

The apertures may be tapered from the second surface to the first surface, which prevents pegging in the apertures.

In yet another embodiment, the apertures are elongated, each having two opposing long sides and two opposing short sides, the short sides extending at an angle in relation to a normal to the first surface. This angled configuration increases the efficiency of the screening process since the area of the aperture is increased in relation to the direction of the passing material to be screened.

The second surface may be bevelled, in order to increase the impact strength of the apertured section.

According to a second aspect of the present disclosure, these objects are achieved by a screen, which has a screen stand and screen media elements, as described above, arranged in the screen stand, the screen media elements having longitudinal sides arranged in a longitudinal direction of the screen stand and transverse sides arranged in a transverse direction of the screen stand.

The use of a screen stand and a number of screen media elements facilitates building a screening device having any desired size.

In one embodiment, the screen media elements are, on their longitudinal sides, provided with at least one projection and/or at least one recess for locking engagement with a corresponding projection and/or recess on neighbouring screen media elements arranged in the screen stand. This is a simple and effective way of fixing the screen media elements to each other.

According to a third aspect of the present disclosure, these objects are achieved by a method for manufacturing a screen media element, comprising the steps of manufacturing an apertured section from a ceramic material, placing the apertured section in a mould, and supplying elastomeric material in the mould, around the apertured section.

This method is a simple way of manufacturing a component for a screening device which is sufficiently durable due to the ceramic material, but which still is flexible and has shock absorbing properties due to the surrounding elastomeric material.

Various other features, objects and advantages of the disclosure will be made apparent from the following description taken together with the drawings.

BRIEF DESCRIPTION OF THE DRAWINGS

This and other aspects of the present disclosure will now be described in more detail, with reference to the appended drawings showing a currently preferred embodiment of the disclosure.

FIG. 2 shows a perspective view of an embodiment of an apertured section according to the present disclosure;

FIG. 3 shows a top view of a further embodiment of an apertured section according to the present disclosure;

FIG. 4 shows a side view of another embodiment of an apertured section according to the present disclosure;

FIG. 5 shows a cross sectional view of yet another embodiment of an apertured section according to the present disclosure.

DETAILED DESCRIPTION

Figure 1:
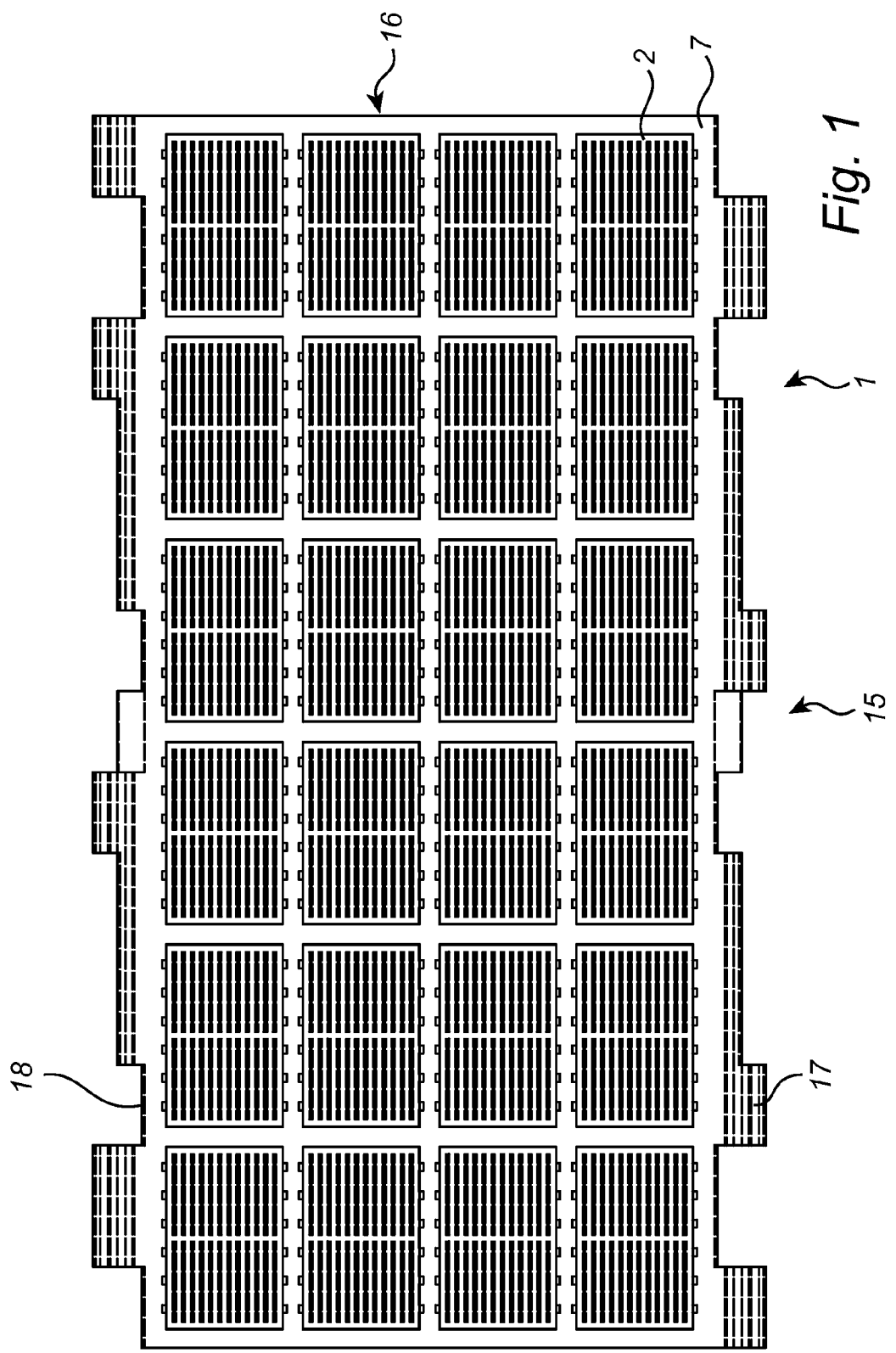
FIG. 1 shows a top view of a screen media element according to the present disclosure.
Figure 6:
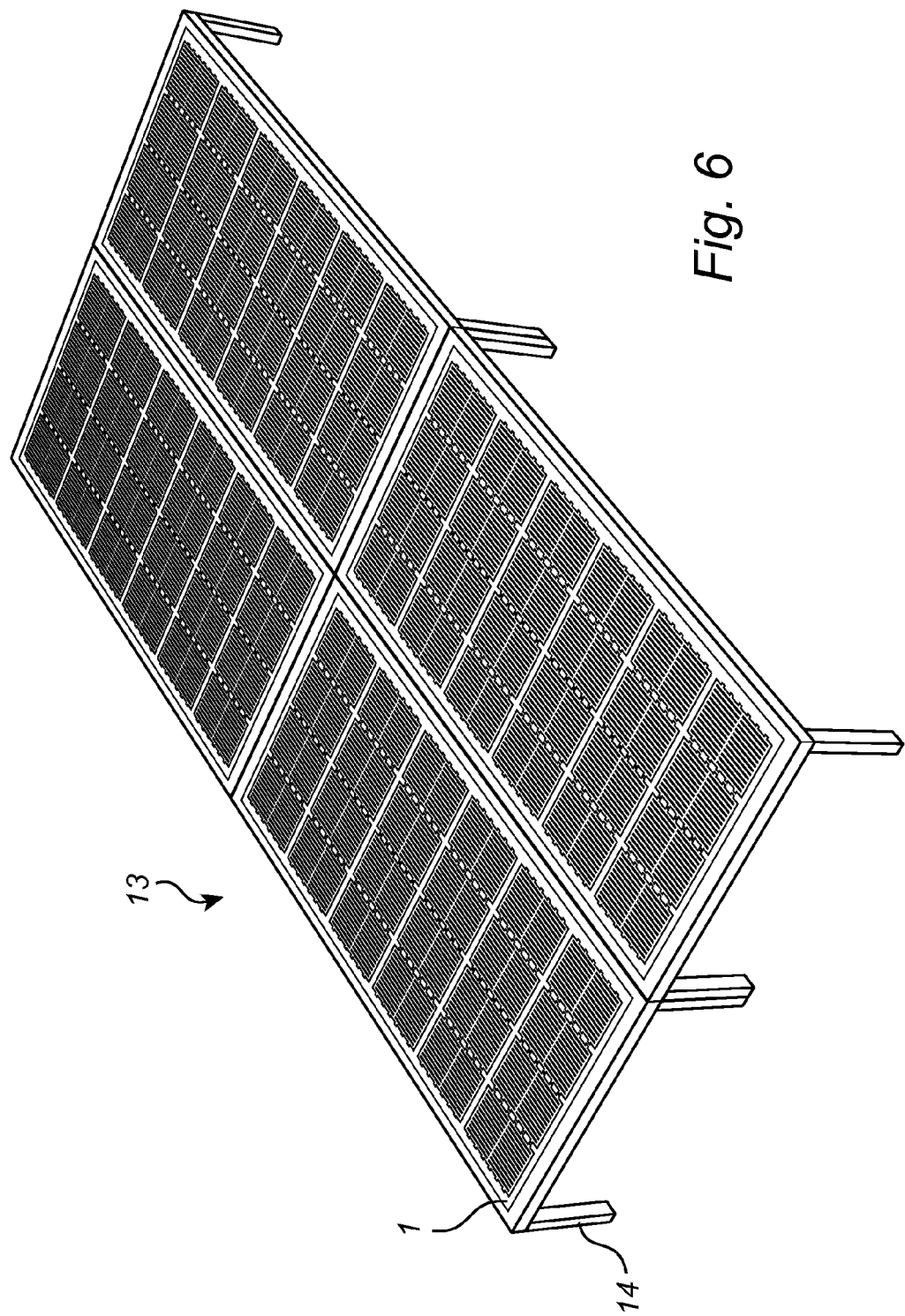
FIG. 6 shows a perspective view of a screen according to the present disclosure.

FIG. 1 shows a screen media element 1 comprising a number of apertured sections 2 and an outer frame 7. The screen media element is essentially rectangular, having two opposing longitudinal sides 15 and two opposing transverse sides 16. The longitudinal sides 15 are provided with projections 17 and/or recesses 18, used for locking engagement with a corresponding projection 17 and/or recess 18 on one or several neighbouring screen media elements 1. The screen media elements 1 are arranged in a screen stand 14. The stand 14 is a frame into which one or more screen media elements are mounted. Each individual stand has a specific size and configuration adapted to the specifically desired number and configuration of screen media elements. The screen stand 14 itself is subjected to vibrations in order to execute the screening process. The longitudinal sides 15 of the screen media element 1 are arranged in the longitudinal direction of the screen stand 14 and the transverse sides 16 of the screen media element 1 are arranged in the transverse direction of the screen stand 14.

The apertured section 2 of the screen media element 1 is fixed in, and partially surrounded by, the outer frame 7. FIGS. 2 and 3 show embodiments of the apertured section 2. The apertured section 2 comprises a first surface 3, i.e. an upper surface intended to receive and carry the material to be screened, a second surface 4 located opposite the first surface 3, and a circumferential surface 6 which connects the first 3 and second 4 surfaces. The circumferential surface 6 preferably comprises two opposing longitudinal surfaces, extending in the same direction as the longitudinal sides 15 of the screen media element 1, and two opposing transverse surfaces, extending in the same direction as the transverse sides 16 of the screen media element 1. The first 3, second 4, and circumferential 6 surfaces together approximately form a box where the length of the box is larger than its width, and the width of the box is larger than its height.

As shown in FIG. 4, the second surface 4 may be bevelled such that the centre part of the above mentioned box has a height which is larger than the height of the transversal, circumferential surfaces 6, the height being the distance extending along a normal to the first surface 3.

The circumferential surfaces 6 comprise at least one projection 8 for engagement with the outer frame 7. These projections are used for fixing the apertured sections 2 into the outer frame 7. The projection(s) 8 might be designed as a number of projections which extend parallel to each other along the longitudinal sides of the circumferential surface 6 and in a direction from the first surface 3 to the second surface 4. These projections may extend either the entire distance or part of the distance from the first surface 3 to the second surface 4. The projection(s) 8 may also be designed as one single projection which extends along each longitudinal side of the circumferential surface 6 in their longitudinal direction, i.e. direction in parallel to the longitudinal plane of the first 3 and second 4 surfaces.

The apertured section 2 is surrounded by the outer frame 7 along the circumferential surface 6 such that the upper surface of the screen media element 1 is even, i.e. the first surface 3 of the apertured sections 2 is flush with the surface of the outer frame 7 when assembled. The apertured sections 2 are made from ceramic material and the outer frame 7 is made of elastomeric material, preferably polyurethane.

The apertured section 2 further comprises a number of apertures 5 extending from the first surface 3 to the second surface 4 such that at least some of the coal or other material to be screened falls through the apertures 5. The apertures 5 are tapered from the second surface 4 to the first surface 3. Further, the apertures 5 are preferably elongated, as seen in the plane of the first surface 3, each having two opposing long sides 10 and two opposing short sides 11.

As shown in FIG. 5, the short sides 11 extend at an angle 12 in relation to a normal to the first surface 3, i.e. the short sides 11 are inclined in the direction of the passing material to be screened. The apertures 5 may be arranged as parallel slots extending across the apertured section 2 in the same direction as the longitudinal sides 15 of the screen media element 1. The apertures 5 may also be arranged as two sets of parallel slots extending across the apertured section 2 in the same direction as the longitudinal sides 15 of the screen media element 1, where the two sets are divided by a portion which extends in the same direction as the transverse sides 16 of the screen media element 1 and over the centre of the apertured section 2.

As shown in FIG. 3, the apertured section 2 may comprise at least one channel 9 containing elastomeric material, formed in the first surface 3. The channel 9 extends between the two sets of parallel slots, which extend across the apertured section 2 in the same direction as the longitudinal sides 15 of the screen media element 1, i.e. across the centre portion of the apertured section 2 which extends in the same direction as the transverse sides 16 of the screen media element 1. The channel 9 may be connected to a number of side channels 19 extending perpendicularly from the channel 9, i.e. between the parallel slots and in the same direction as the parallel slots.

The apertures 5 may not only have an elongated shape, as discussed above, but may also have other geometric shapes such as being circular or having a free form.

The above discussed screen media element 1 is manufactured by a method comprising a number of steps. The first step comprises manufacturing an apertured section 2 from a ceramic material. The second step comprises placing the apertured section 2 in a mould. The third step comprises supplying an elastomeric material such as polyurethane in the mould and around the apertured section 2 such that the elastomeric material forms an outer frame which surrounds the apertured section along its circumferential surface 6. The outer frame of the screen media element could e.g. be manufactured by injection moulding or by compression moulding.

The screen media element 1 is particularly useful for dewatering coal. When dewatering coal, a slurry containing coal is fed onto the first surface 3 of the apertured section 2. Water containing suspended particles passes through the apertures 5, whereas larger particles and pieces of coal remain on the first surface 3 of the apertured section 2. In other words, the liquid phase passes through the screen media element 1, and the solid phase stays on top of the screen media element 1. The screen media element 1 may also be used for dewatering other minerals, ore and rock materials.

Additionally, the screen media element may be used for screening coal and other minerals, ore and rock materials.

When designing the apertured section 2 of the screen media element 1, the apertures used for dewatering are generally narrower than the apertures used for screening. Manufacturing apertured sections with the narrow apertures required for dewatering in a size corresponding to an entire screen media element often poses a problem. Therefore, it is practical to use a plurality of smaller apertured sections 2 in one screen media element 1, such as shown in FIG. 1.

The person skilled in the art realizes that the present disclosure by no means is limited to the preferred embodiments described above. On the contrary, many modifications and variations are possible within the scope of the appended claims. For example, also the transverse sides of the screen media elements may be provided with projections or recesses for locking engagement with other screen media elements. Further, the channels may extend in any form across the first surface of the apertured section. Also, the apertures could have any suitable shape in the direction from the second surface to the first surface of the apertured section. Also, one could use an elastomeric material other than polyurethane. Further, embodiments other than those shown in the drawings, e.g. screen media elements having fewer or more apertured sections, are possible.

We claim:

1. A screen media element having at least one apertured section, said apertured section having a first surface intended to receive and carry material to be screened, a second surface opposite said first surface, apertures extending from the first surface to the second surface, and a circumferential surface connecting said first and second surfaces, said apertured section being surrounded by an outer frame along the circumferential surface, characterised in that said apertured section is made from ceramic material and that said outer frame is made of elastomeric material,
wherein at least one channel is formed in the first surface of the apertured section, said channel containing elastomeric material.

2. A screen media element as claimed in claim 1, wherein the elastomeric material is polyurethane.

3. A screen media element as claimed in claim 1, wherein at least one projection is formed on the circumferential surface of the apertured section for engagement with the outer frame.

4. A screen media element as claimed in claim 1, wherein the apertures are tapered from the second surface to the first surface.

5. A screen media element as claimed in claim 1, wherein the apertures are elongated, each having two opposing long sides and two opposing short sides, the short sides extending at an angle in relation to a normal to the first surface.

6. A screen media element as claimed claim 1, wherein the second surface is bevelled.

7. A screen comprising:
a screen stand;
screen media elements arranged in the screen stand, the screen media elements having at least one apertured section, said apertured section having a first surface intended to receive and carry material to be screened, a second surface opposite said first surface, apertures extending from the first surface to the second surface, and a circumferential surface connecting, said first and second surfaces, said apertured section being surrounded by an outer frame along the circumferential surface, characterised in that said apertured section is made from ceramic material and that said outer frame is made of elastomeric material, wherein the screen media elements have longitudinal sides arranged in a longitudinal direction of the screen stand and transverse sides arranged in a transverse direction of the screen stand,
wherein at least one channel is formed in the first surface of the apertured section, said channel containing elastomeric material.

8. A screen as claimed in claim 7, wherein the screen media elements on their longitudinal sides are provided with at least one projection and/or at least one recess for locking engagement with a corresponding projection and/or recess on neighbouring screen media elements arranged in the screen stand.

* * * * *